US011192987B2

(12) United States Patent
Backfolk et al.

(10) Patent No.: US 11,192,987 B2
(45) Date of Patent: Dec. 7, 2021

(54) PROCESS FOR PRODUCTION OF FILM COMPRISING MICROFIBRILLATED CELLULOSE AND NANOPARTICLES

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 108 days.

(21) Appl. No.: 16/489,801

(22) PCT Filed: Feb. 27, 2018

(86) PCT No.: PCT/IB2018/051216
§ 371 (c)(1),
(2) Date: Aug. 29, 2019

(87) PCT Pub. No.: WO2018/158676
PCT Pub. Date: Sep. 7, 2018

(65) Prior Publication Data
US 2020/0010629 A1 Jan. 9, 2020

(30) Foreign Application Priority Data

Mar. 1, 2017 (SE) ................................. 1750219-6

(51) Int. Cl.
| | |
|---|---|
| *C08J 5/18* | (2006.01) |
| *C08L 1/02* | (2006.01) |
| *C08K 3/36* | (2006.01) |
| *C08K 3/34* | (2006.01) |
| *D21H 17/68* | (2006.01) |
| *D21H 11/18* | (2006.01) |
| *D21H 21/52* | (2006.01) |

(52) U.S. Cl.
CPC ................. *C08J 5/18* (2013.01); *C08K 3/346* (2013.01); *C08K 3/36* (2013.01); *C08L 1/02* (2013.01); *D21H 11/18* (2013.01); *D21H 17/68* (2013.01); *D21H 21/52* (2013.01); *C08J 2401/02* (2013.01); *C08K 2201/011* (2013.01); *C08L 2203/16* (2013.01); *C08L 2205/04* (2013.01); *C08L 2205/16* (2013.01)

(58) Field of Classification Search
CPC ... C08J 5/18; C08K 3/346; C08K 3/36; C08L 1/02
See application file for complete search history.

(56) References Cited

U.S. PATENT DOCUMENTS

| | | | | |
|---|---|---|---|---|
| 5,277,764 | A * | 1/1994 | Johansson | D21H 21/10 162/175 |
| 8,658,287 | B2 | 2/2014 | Berglund et al. | |
| 2012/0216718 | A1 | 8/2012 | Berglund et al. | |
| 2012/0291974 | A1 | 11/2012 | Kajanto | |
| 2013/0017400 | A1 | 1/2013 | Imai et al. | |
| 2014/0302336 | A1 | 10/2014 | Heiskanen et al. | |

FOREIGN PATENT DOCUMENTS

| | | |
|---|---|---|
| CN | 102791924 A | 11/2012 |
| CN | 102821949 A | 12/2012 |
| CN | 103025813 A | 4/2013 |
| EP | 2639351 A1 | 9/2013 |
| EP | 2917402 | 5/2014 |
| JP | 2010202987 A | 9/2010 |
| JP | 2012007247 A | 1/2012 |
| JP | 2014095008 A | 5/2014 |
| WO | 2014072913 A1 | 5/2014 |
| WO | 2016185397 A1 | 11/2016 |

OTHER PUBLICATIONS

International Search Report for PCT/IB2018/051216, dated May 16, 2018.
Wu, C. etal. "Ultrastrong and High Gas-Barrier Nanocellulose/Clay-Layered Composites" In:Biomacromolecules, Jun. 2012, vol. 13, No. 6, pp. 1927-1932.
Ferreira Krol, L. et al."Microfibrillated cellulose-Si02 composite nanopapers produced by spray deposition" In: J. Mater. Sci., Mar. 2015, vol. 50, No. 11, pp. 4095-4103.
Sehaqui, H. "Fast Preparation Procedure for Large, Flat Cellulose and Cellulose/Inorganic Nanopaper Structures" In: Biomacromolecules, Sep. 2010, vol. 11, No. 9, pp. 2195-2198.
Salajkova, M. "Tough nanopaper structures based on cellulose nanofibers and carbon nanotubes" In: Composites Science and Technology, Oct. 2013, vol. 87, pp. 103-110.
Kim, Jeong-Hoon et al., Colloidal silica nanoparticle-assisted structural control of cellulose nanofiber paper separators for lithium-ion batteries, Journal of Power Sources 242 (2013) 533-540.
Varanasi, Swambabu et al., Cellulose nanofibre composite membranes—Biodegradable and recyclable UF membranes, Chemical Engineering Journal 265 (2015), 138-146.
Garusinghe, Uthpala et al., Assembly of nanoparticles-polyelectrolyte complexes in nanofiber cellulose structures, Colloids and Surfaces A: Physicochemical and Engineering Aspects, 513 (2017), 373-379.
Extended European Search report for European patent application No. 18761450.8-1102 dated Oct. 26, 2020.

* cited by examiner

Primary Examiner — Wenwen Cai
(74) Attorney, Agent, or Firm — Greer, Burns & Crain, Ltd.

(57) ABSTRACT

The present invention relates to a new process for improving runnability and dimensional stability when manufacturing a film comprising high amounts of microfibrillated cellulose (MFC) without negatively impacting the film properties. According to the present invention a high amount of nanoparticles is used as an additive, optionally together with a retention polymer.

9 Claims, No Drawings

PROCESS FOR PRODUCTION OF FILM COMPRISING MICROFIBRILLATED CELLULOSE AND NANOPARTICLES

This application is a U.S. National Phase under 35 U.S.C. § 371 of International Application No. PCT/IB2018/051216 filed Feb. 27, 2018, which claims priority under 35 U.S.C. §§ 119 and 365 to Swedish Application No. 1750219-6, filed Mar. 1, 2017.

TECHNICAL FIELD

The present invention relates to a new process for improving runnability and dimensional stability when manufacturing a film comprising high amounts of microfibrillated cellulose (MFC) without negatively impacting the film properties. According to the present invention a high amount of nanoparticles is used as an additive, optionally together with one or more retention polymers.

BACKGROUND

The manufacturing of a film from a web comprising microfibrillated cellulose (MFC) on a paper machine or similar wet laid technique at high speeds is very demanding. Due to a low dewatering speed, which is related to MFC fineness, charge and quantity, there are problems when releasing the material from the wire of the paper machine. MFC is also capable of forming a gel at relatively low solids concentration. One solution would be to reduce machine speeds, but then the production of the film is not economically attractive. Thus, at higher speeds stronger dewatering is required which hence results in the above problem. There is also a risk that a too strong dewatering may cause pin-holes in the web, which deteriorates the quality of the film. Another critical variable is the formation of the web, which in turn affects the web properties.

It is known that MFC films or webs comprising high amounts of MFC are difficult to dewater. Various solutions have been tested such as different retention chemicals, polymers, self-healing solutions, long fibers, modifications to wire and mesh size etc. Typically, the cationic demand or charge of papermaking fiber suspensions in a wet end is close to zero which hence facilitate particle and fiber flocculation. Thus, charge regulation such as ionic neutralization or polymer bridging assist in traditional fiber flocculation and dewatering and retention.

The use of retention chemicals based on nanoparticles, sometimes referred to as colloidal particles, has been tested to some extent, particularly in conventional papermaking which hence aims towards charge and inter-particle and intra-particle control. Silica nanoparticles, for example, can be combined with cationic chemicals (polymers) typically in a ratio of 1:2 (polymer:silica) and nanoparticle doses in normal papermaking is about ca 100-400 g/ton. An overdose of retention chemicals in papermaking would lead to increased porosity, uneven and stronger flocculation, two-sideness, problem with dimensional stability and subsequently uneven product quality.

Various manufacturing methods have been proposed to make MFC or NFC films such as free standing films by coating NFC on plastic support material like PE, PET, and so on (WO2013060934A2). In many cases, the dewatering is limited to evaporation and/or contact drying which influences both film quality and manufacturing rate.

WO2012107642A1 addresses the problem with the hygroscopic properties of MFC, which was solved by using organic solvent when preparing the films.

WO2014154937 A1 relates to a method for production of paper or board comprising providing a stock comprising cellulose fibers, adding a mixture comprising microfibrillated cellulose and a strength additive to the stock, adding a microparticle to the stock after the addition of said mixture, dewatering the stock on a wire to form a web, and drying the web.

WO2011055017 A1 relates to a process for the preparation of paper or board comprising: adding a retention system to a stream of stock entering a paper machine head box, directing the stream of stock to a wire, dewatering the stream of stock on the wire to form a paper web, and drying the paper web, wherein the retention system comprises a water-soluble cationic polymer, and nanocellulose acting like a micro particle, wherein the nanocellulose is added in an amount of less than 1% as active substance based on dry solids weight of the stock.

There is a need for a method and a composition where the dewatering rate can be significantly improved when forming a film from a wet web comprising high amounts of microfibrillated cellulose. More preferably, the solution should improve both the rate of dewatering and e.g. barrier properties of the film, which usually are contradicting properties.

SUMMARY

It is an object of the present disclosure to provide an improved method of manufacturing a film comprising microfibrillated cellulose, which eliminates or alleviates at least some of the disadvantages of the prior art methods.

It has been surprisingly found that high nanoparticle content, such as a high silica content as used in the present application leads to improved runnability, improved dimensional stability and less shrinkage on the paper machine. Surprisingly, high amount of nanoparticles, such as silica, did not negatively affect the oxygen barrier properties of the MFC film, although based on opacity/light transmittance of the film fibril-to-fibril bonding was substantially decreased. It has also been seen that high dosage of nanoparticle, particularly particles having a diameter of less than 100 nm in one dimension, has a positive effect on wet strength and dewatering. A further benefit of the present invention is that the products obtained are easier to re-disperse in water in view of the fibril spacing effect of the high amount of nanoparticles.

According to a first aspect, there is provided a process for the production of an intermediate thin substrate or film comprising the steps of:
a) providing a suspension comprising microfibrillated cellulose, wherein the content of the microfibrillated cellulose of said suspension is at least 60 weight-% based on the weight of solids of the suspension;
b) adding nanoparticles to said suspension to provide a mixture of said microfibrillated cellulose and said nanoparticles, wherein the total amount of nanoparticles added is more than 50 kg on dry basis per ton of dry solids of the suspension;
c) providing said mixture to a medium to form a web; and
d) dewatering said web to form an intermediate thin substrate or film.

In one embodiment, the process is carried out in a paper making machine.

The nanoparticles can be e.g. silica or modified silica or silicates, alumina, nanoclays such as montmorillonite or bentonite, nanobentonite, nanokaolinite, nanotalcum, modified silica, nanolatex, nanostarch, aerogel or aerosol, sol-gel silica, modified silica such as doped silica with Al compounds, nanoPCC, swelling clays, zeolites, carbon nanotubes, carbon nanoparticles etc. In one embodiment of the present invention, the nanoparticles are silica or nanosilica. In one embodiment of the invention, the particles are anionic. In one embodiment of the invention, said silica or nanosilica or microsilica (also referred to as colloidal silica) is anionic at neutral or alkaline pH. In one embodiment of the present invention, the particles are amphoteric at neutral or alkaline pH. In one embodiment of the present invention, the particles are non-ionic. The nanoparticles used according to the present invention have a diameter of less than 100 nm, such as from 1 nm to 100 nm, in one dimension, but can form clusters which are thus larger aggregates of particles. Thus, when clusters are formed, such aggregates typically have a size corresponding to what may be referred to us colloidal materials.

The amount of nanoparticles added is more than 50 kg/ton, such as 50-400 kg/ton, 51-400 kg/ton, 50-300 kg/ton, 51-300 kg/ton, 50-250 kg/ton, 51-200 kg/ton or 100-200 kg/ton (on dry basis per ton of dry solids of the suspension).

The medium used in step c) can be porous or non-porous. The porous medium can for example be a wire, a membrane or a substrate such as paper, board or a porous film. The non-porous medium can for example be a carrier substrate used in for example cast coating. In one embodiment, cast forming is used when forming the web. In cast coating and cast forming, a non-porous medium is used. Thus, in cast coating, the suspension is provided to a substrate such as a plastic film or composite medium. Thus, the initial dewatering will predominantly occur in the direction away from the non-porous medium. In cast forming, the suspension is provided directly to a non-porous medium, such as a metal belt. Different methods for application can be used, such as different types of slots etc. The initial dewatering will therefore also in cast forming predominantly occur in the direction away from the non-porous medium.

One or more retention polymers may also be used in accordance with the present invention. In one embodiment of the present invention, a specific ratio of retention polymer to particle is used. The ratio (by weight) depends on the charge and molecular weight of the retention polymer used, but is typically from about 1:3 to about 1:20, such as from about 1:5 to 1:12 or 1:8 to 1:10.

Said retention polymer is preferably a cationic polymer such as cationic starch, polyaminoamide-epichlorohydrin (PAE), polyamidoamine (PAMAM), cationic polyacryl amide or copolymer thereof (C-PAM), polyethylene oxide (PEO) or other copolymers thereof or polymers typically used in retention/drainage studies. Examples of such polymers are cationic polyvinyl amine (PVAm), cationic polydiallyldimethylammonium chloride (PDADMAC), polyethylene imine (PEI), dicyandiamide formaldehyde (DCD), cationic polyvinylalcohol (C-PVA), cationic protein, etc. Further examples of polymers are any copolymer of acrylamide and/or methacrylamide, prepared using at least as one of the comonomers a cationically charged or cationically chargeable monomer. Such monomers include methacryloyloxyethyltrimethyl ammonium chloride, acryloyloxyethyltrimethyl ammonium chloride, 3-(methacrylamido)propyltrimethyl ammonium chloride, 3-(acryloylamido) propyltrimethyl ammonium chloride, diallyldimethyl ammonium chloride, dimethylaminoethyl acrylate, dimethylaminoethyl methacrylate, dimethylaminopropylacrylamide, dimethylaminopropylmethacrylamide, or a similar monomer. The polymer may also contain monomers other than acrylamide, methacrylamide, or some cationic or cationizable monomer.

The nanoparticles can be dosed in various ways such as before or after the retention polymers. One option is to use an in-line mixing system to make mixing more efficient. In one embodiment of the present invention, the nanoparticles are added to the microfibrillated cellulose during or after the manufacturing phase of MFC from pulp. One way of carrying out the mixing is to provide one stream of MFC which is essentially free from nanoparticles and mix that stream with another stream which contains a mixture of MFC and nanoparticles. These two streams are thus mixed to provide a suspension comprising both MFC and nanoparticles.

In one embodiment of the present invention, the microfibrillated cellulose may have a Schopper Riegler value (SR°) of more than 85 SR°, or more than 90 SR°, or more than 92 SR°. The Schopper-Riegler value can be determined through the standard method defined in EN ISO 5267-1.

The basis weight of the obtained film is preferably <35 g/m$^2$, more preferably <30 g/m$^2$ and most preferably <25 g/m2.

According to a further embodiment of the present invention, there is provided a laminate comprising a film prepared according to the present invention and a thermoplastic polymer coating, such as any one of a polyethylene, EVOH, starch, styrene/butadiene, styrene/acrylate, polypropylene, a polyethylene terephtalate and a polylactic acid. The coating can be provided e.g. by extrusion coating, film coating or dispersion coating. Alternatively the coating can be applied by surface sizing if it comprises polysaccharide, polysaccharide derivative, polyurethane, polyurethane-elastomer, styrene/acrylate, or combinations thereof. This laminate structure may provide for even more superior barrier properties. In one embodiment, the MFC film can be present between to coating layers, such as between two layers of polyethylene, with or without a tie layer. According to one embodiment of the present invention, the polyethylene may be any one of a high density polyethylene and a low density polyethylene or mixtures or modifications thereof that could readily be selected by a skilled person. According to further embodiment there is provided the film or the laminate according to present invention, wherein said film or said laminate is applied to the surface of any one of a paper product and a board. The film or laminate can also be part of a flexible packaging material, such as a free standing pouch.

The intermediate thin substrate is an intermediate product which has not yet been processed into the final film having the characteristic OTR values, but may processed into such a film in a later converting process.

One embodiment of the present invention is a film produced according to the process of the present invention. The film is a thin sheet, mouldable film or web. It comprises high amount of microfibrillated cellulose and can be laminated to form a multilayered structure. The film may be opaque, transparent or translucent. The OTR (oxygen transmission rate) value (measured at standard conditions) of the film is <200 cc/m2*day measured at 50% RH, 23° C., preferably <30, more preferably <15 and most preferably <10 (i.e. before further treatment such as PE lamination) at a grammage of 10-50 gsm. The thickness of the film can be selected dependent on the required properties. Film thickness may for example be 10-100 µm, such as 20-50 or 30-40 µm, having a grammage of for example 10-50 gsm, such as 20-30 gsm. The film has good barrier properties (e.g. to gas, aroma, light, etc).

A further embodiment of the present invention is a product comprising the film produced according to the process of the present invention.

One embodiment of the present invention is a flexible package produced according to the process of the present invention. A further embodiment of the invention is a rigid package comprising a film produced according to the present invention. The product may also be used for other purposes, such as in cement, person care or food products, moulded products, composites or as an additive in rubber or plastic. A composite product may for example be an extruded laminate or a film comprising MFC which is blended with thermoplastic polymer e.g. in the form of a masterbatch. For example, film reject or waste material from the manufacture of a film can be collected and re-used as composite additive.

DETAILED DESCRIPTION

In one embodiment of the present invention, a film is formed in a paper making machine or according to a wet laid production method, by providing a suspension onto a wire and dewatering the web to form an intermediate thin substrate or said film. According to one embodiment, a suspension comprising microfibrillated cellulose is provided to form said film. In an alternative embodiment of the present invention, a film is formed by casting.

The microfibrillated cellulose content of the suspension may, according to one embodiment be in the range of from 60 to 99.9 weight-% based on the weight of solids of the suspension. In one embodiment, the microfibrillated cellulose content of the suspension may be in the range of 70 to 99 weight %, in the range of 70 to 95 weight- %, or in the range of from 75 to 90 weight-%.

In one embodiment of the present invention, enhanced dewatering effect of MFC suspension in wet laid production method is achieved by dosing the anionic nanoparticles in an early stage of the manufacturing process, not as part of the short circulation retention system in the machine used.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils,: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ or 80-200 $m^2/g$ when determined for a solvent exchanged and freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils. Preferably, the MFC used according to the present invention is substantially free from unrefined fibers, which can be visually determined using optical microscopy.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

According to another embodiment, the suspension may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension may also comprise other process or functional additives, such as fillers, pigments, wet strength chemicals, retention chemicals, cross-linkers, softeners or plasticizers, adhesion primers, wetting agents, biocides, optical dyes, fluorescent whitening agents, debonders, defoaming chemicals, hydrophobizing chemicals such as AKD, ASA, waxes, resins, etc.

The term "dewatering" as used herein encompasses any form of dewatering, including for example evaporation, dewatering under pressure, dewatering using radiation etc. The dewatering can be carried out in one or more steps and may involve one form of dewatering or several forms of dewatering in combination.

The papermaking machine that may be used in the process according to the present invention may be any conventional type of machine known to the skilled person used for the production of paper, paperboard, tissue or similar products.

Subsequent to the wet web being placed onto medium, it is dewatered to form an intermediate thin substrate or film.

The dewatering may be performed by using known techniques with single wire or twin wire system, frictionless dewatering, membrane-assisted dewatering, vacuum- or ultrasound assisted dewatering, etc. After the wire section, the wet web is further dewatered and dried by mechanical pressing including shoe press, hot air, radiation drying, convection drying, etc. The film might also be dried or smoothened by soft or hard nip (or various combinations) calenders etc.

According to one embodiment the wet web is dewatered by vacuum, i.e. water, and other liquids, is sucked from the furnish when it is placed on the wire.

As an alternative to a wire, the suspension may also be provided to a porous medium such as a membrane or substrate such as paper, board or a porous film.

According to one embodiment, the film comprising the microfibrillated cellulose and nanoparticles or nanoparticles may be laminated to or with a thermoplastic polymer. The thermoplastic polymer may be any one of a polyethylene (PE), a polyethylene terephthalate (PET) and a polylactic acid (PLA). The polyethylene may be any one of a high density polyethylene (HDPE) and a low density polyethylene (LDPE), or various combinations thereof. Further examples of polyethyelene are ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE), chlorinated polyethylene (CPE). By using for instance PLA as the thermoplastic polymer the product may be formed completely from biodegradable materials. Further examples of suitable polymers are PVDC, Polyethylene furanoate, polymers of lactic acid such as PLA, Polybutylene succiante. A polymer coating can also be applied by for example a printing process such as flexogravure roll (anilox).

The film or the laminate may also be applied to other paper products, such as food containers, paper sheets, paper boards or boards or other structures that need to be protected by a barrier film.

EXAMPLES

Example 1

The pulp used was bleached kraft pulp fibrillated to SR>90. The KP1 is the reference furnish comprising mainly of microfibrillated cellulose and small amounts of anionic nanosilica (addition level 5 kg/tn). The KP2 and KP3 are the same MFC grades but with higher level of silica (140 and 50 kg/tn respectively and with different point of addition (added before/during fibrillation (KP2), and added during furnish preparation of the furnish (KP3)).

The results show that high amount of silica can be used.

The film was made on a fourdrinier type of pilot paper machine to a grammage of ca 25-30 g/m². Process and performance chemicals were used e.g. cationic starch and hydrophobic internal sizing chemical (AKD). Targeted moisture content was 6.5%.

| | Unit | | KP1 | KP2 | KP3 |
|---|---|---|---|---|---|
| Property | | | | | |
| Microfibrillated fiber | % | | 100 | 100 | 100 |
| Added nanosilica (anionic) | kg/tn | | 5 | 140 | 50 |
| Amount of nanosilica (anionic) in film produced | kg/tn | | 2.1 | 59.5 | 21.3 |
| Ash content determined at 525° C. | wt-% [ISO 1762] | | 0.45 | 2.13 | 2.38 |
| Property (dry sheets) | | | | | |
| Grammage | g/m² | | 31.4 | 25.5 | 25.5 |
| Thickness, single sheet | μm | | 48 | 40 | 41 |
| Tear index, md | mNm²/g | | 4 | 4.4 | 4 |
| Tear index, cd | mNm²/g | | 4.3 | 4.2 | 4 |
| E-modulus, cd | Mpa | | 1705 | 2077 | 2044 |
| E-modulus, md | Mpa | | 4226 | 3003 | 3631 |
| OTR value | cc/m²/d | 23 C., 50 RH | 644/1130 | 17/48 | measurement failed |
| Dimensional stability, 33-84% RH, total CD/MD geom. mean | % | | 0.44 | 0.37 | 0.42 |

CD: cross direction
MD: machine direction

In view of the above detailed description of the present invention, other modifications and variations will become apparent to those skilled in the art. However, it should be apparent that such other modifications and variations may be effected without departing from the spirit and scope of the invention.

The invention claimed is:

1. A process for the production of a film, the process comprising the steps of:
 a) providing a suspension comprising microfibrillated cellulose, wherein the content of the microfibrillated cellulose of said suspension is at least 60 weight % based on the weight of solids of the suspension;
 b) adding nanoparticles and a retention polymer to said suspension to provide a mixture of said microfibrillated cellulose, said retention polymer, and said nanoparticles, wherein the total amount of nanoparticles added is more than 50 kg on dry basis per ton of dry solids of the suspension, wherein said nanoparticles are nanosilica nanoparticles that are anionic at neutral or alkaline pH and have at least one dimension less than 100 nm, and wherein said retention polymer comprises starch;
 c) providing said mixture to a medium to form a web; and d) dewatering said web to form a film having an oxygen transmission rate <200 cc/m$^2$*day measured at 50% RH, 23° C., and a grammage of 10-50 gsm.

2. A process according to claim 1, wherein the weight ratio of retention polymer to nanoparticles is in the range of from 1:3 to 1:20.

3. A process according to claim 1, wherein said retention polymer further comprises starch, polyaminoamide, epichlorohydrin, cationic polyacryl amide, copolymers of cationic polyacryl amide, and mixtures thereof.

4. A process according to claim 1, wherein the total amount of nanoparticles is less than 300 kg/ton on dry basis per ton of dry solids of the suspension.

5. A process according to claim 4, wherein the total amount of nanoparticles is less than 200 kg/ton on dry basis per ton of dry solids of the suspension.

6. A process according to claim 1, wherein the medium used in step c) is porous.

7. A process according to claim 6, wherein the medium used in step c) is a porous wire.

8. A process according to claim 1, wherein the medium used in step c) is non-porous.

9. A process according to claim 1, wherein the weight ratio of retention polymer to nanoparticles is in the range of from 1:5 to 1:12.

\* \* \* \* \*